Nov. 15, 1932.                R. PORCELLO                1,888,180
                    BABY CARRIAGE QUILT HOLDING DEVICE
                          Filed July 20, 1932

Inventor
*Raphael Porcello*

By *Miller & Miller*
Attorneys

Patented Nov. 15, 1932

1,888,180

UNITED STATES PATENT OFFICE

RAPHAEL PORCELLO, OF RICHMOND HILL, NEW YORK

BABY CARRIAGE QUILT HOLDING DEVICE

Application filed July 20, 1932. Serial No. 623,649.

This invention relates to a baby carriage quilt holding device and has for an object to provide an improved holding means for baby carriage quilts to prevent the same from being lost or tossed from the baby carriage.

A further object of this invention is to provide a baby carriage quilt holding device which also serves as a baby belt for the baby in the carriage to prevent the baby from being lost from climbing out or falling out of the baby carriage.

Still a further object of this invention is to provide a safety belt and quilt holding means for baby carriages which will hold both the quilt and the baby in the carriage against falling out therefrom.

Yet an additional object of this invention is to provide a quilt holding means for baby carriages which may be securely fastened to the baby carriage or quickly and easily detached therefrom at will.

Figure 1:
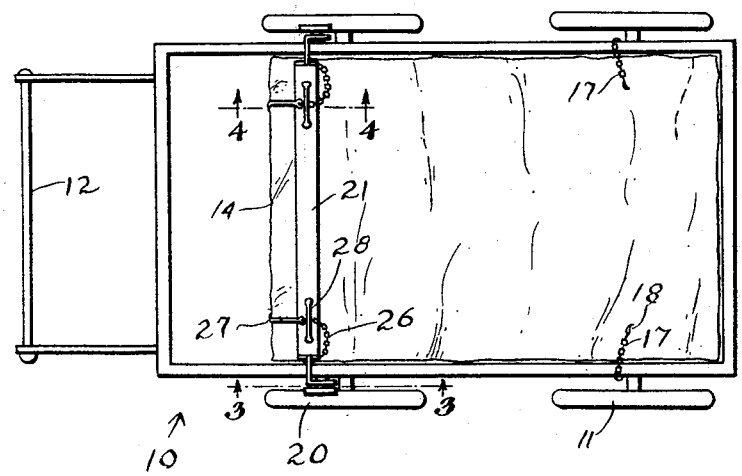
Figure 2:
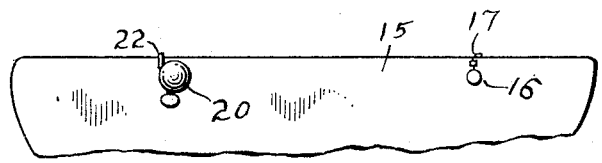
Figure 3:
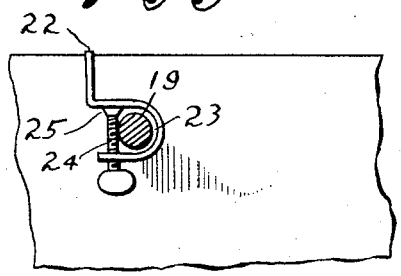
Figure 4:

With the foregoing and other objects in view, as will hereinafter become apparent, this invention comprises the constructions, combinations and arrangements of parts, hereinafter set forth, disclosed and shown on the accompanying drawing. In this drawing, Figure 1 is a plan view of the baby carriage to which this quilt holder invention has been applied, Figure 2 is an elevational view of one side of the baby carriage, Figure 3 is a section on line 3—3 of Figure 1, and Figure 4 is a section on line 4—4 of Figure 1.

There is shown at 10 a conventional representation of a baby carriage having wheels 11 and a handle 12. A baby quilt is shown at 14 for the use of the baby to occupy the carriage 10. Secured to the sides 15 of the baby carriage 10 at the foot thereof by means of a button or screw 16 is a chain 17 whose other end 18 is sewed or pinned to the foot of the quilt. A similar chain 17 is similarly secured to the other side of the foot of the quilt 14.

Secured to the sides 15 of the baby carriage 10 adjacent the head thereof are the conventional hood receiving posts or studs 19 having post heads 20, the hood not being shown. A belt or strap 21 has secured to each end thereof a hook 22 having the curved portion 23 adapted to pass about the post 19. The end of the curved portion 23 is threaded to receive a wing bolt 24 passing therethrough whose opposite end 25 is received against the other side of the U formed by the curved end 23 of hook 22.

Also secured to each end of the strap 21 is a chain 26, to the other end of which is secured a resilient hook 27, the resilient hook 27 being clipped over the end of quilt 14. Eye members 28 fastened adjacent each end of the strap 21 receive and allow the claim 26 to pass therebeneath.

In operation, the chain 17 may be detachable either at the screw 16 or pin means 18 or at both places, the chain 17 securing the foot of the quilt 14 from being displaced from the carriage by the baby. The strap 21 is secured in place by means of the hooks 22 about the posts 19, and resilient hooks 27 resiliently receive the ends of the quilt 14. The strap 21 having eye members 28 through which the chains 26 pass, also acts as a safety belt for the baby in the carriage, the strap 21 being held slightly above the quilt 14 by means of the hooks 22, thus allowing the baby free movement within the carriage, but preventing the baby from sitting up and being liable to fall over the sides of the carriage.

The novel features and the operation of this device will be apparent from the foregoing description. While the device has been shown and the structure described in detail, it is obvious that this is not to be considered limited to the exact form disclosed, and that changes may be made therein within the scope of what is claimed without departing from the spirit of the invention.

Having thus set forth and disclosed the nature of this invention, what is claimed is:

1. A baby quilt holder and baby holding device comprising a strap, hook means projecting from each end of said strap, means for detachably securing said hook means to a hood supporting post of a baby carriage, and means extending from each end of said strap for detachably engaging the baby quilt.

2. A baby quilt holder and baby holding device comprising a strap, hook means projecting from each end of said strap, means for detachably securing said hook means to a hood supporting post of a baby carriage, means extending from each end of said strap for detachably engaging the baby quilt, said latter means comprising a flexible chain, an eye member on said strap through which said chain passes, and a resilient hook on the end of said chain adapted to receive an edge of the baby quilt therein.

In testimony whereof I affix my signature.

RAPHAEL PORCELLO.